Jan. 17, 1967  D. BELLAMY, JR  3,298,597
PARENTERAL SOLUTION CONTAINER
Filed Sept. 12, 1963
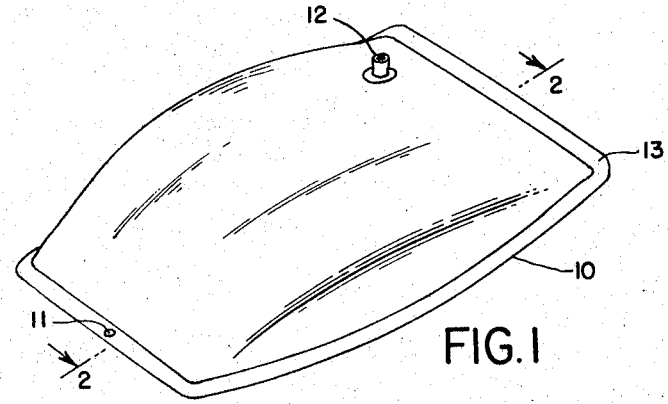
FIG. 1
FIG. 2
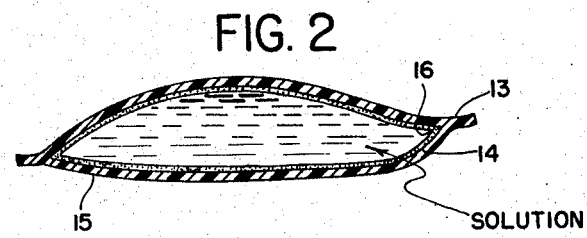
FIG. 3
FIG. 4
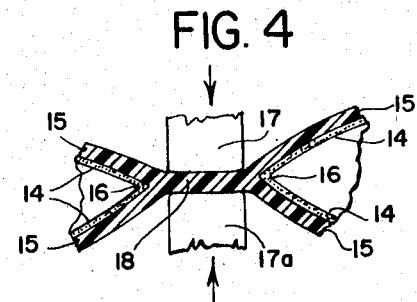
INVENTOR.
DAVID BELLAMY JR.
BY
ATTORNEY

United States Patent Office 3,298,597
Patented Jan. 17, 1967

3,298,597
PARENTERAL SOLUTION CONTAINER
David Bellamy, Jr., Glenview, Ill., assignor to Baxter Laboratories, Inc., Morton Grove, Ill., a corporation of Delaware
Filed Sept. 12, 1963, Ser. No. 308,528
3 Claims. (Cl. 229—55)

The present invention relates to a container for the packaging and storage of solutions. More particularly, it relates to a superior plastic container especially useful for the storage of therapeutic parenteral solutions, having a pharmacologically acceptable inner layer which completely surrounds the contents and a strength-providing outer layer completely surrounding the inner layer. It further relates to a method of making such a container.

A great number of attempts have been made to devise a plastic bag-like container suitable for use with parenteral solutions. However, none of these attempts have been completely successful, for a variety of reasons. Some of them have failed because the plastic material employed was inadequate to sufficiently limit moisture vapor transmission through the plastic walls of the container under the widely varient humidity and temperature conditions encountered in the storage of such containers. The consequent loss of water, of course, resulted in solutions in which the solute was present in a higher concentration than was expected, a situation which could be therapeutically disadvantageous. Other attempts failed because the plastic material selected contained undesirable "leachables," i.e. pharmacologically undesirable substances that were dissolved out of the film by the solution with which it was in contact. This, of course, resulted in solutions, intended for injection, which contained foreign components, many of which were toxic. Still other attempts failed for a variety of other reasons such as the plastic material lacking the strength needed to sustain the normal jolts and hazards of shipping.

According to this invention, there has been provided a highly satisfactory laminated-wall, plastic solution container which has a pharmacologically acceptable r.f. (radio frequency) heat-sealable, inner layer of superior moisture vapor transmission properties, the inner layer completely surrounding the parenteral solution, and a radio frequency heat-sealable, strengthening outer layer which in turn completely encloses the inner layer.

In the preferred practice of the present invention, the bag is formed of a laminate of a radio frequency heat-sealable polyvinylchloride and a pharmacologically acceptable radio frequency heat-sealable polyhalohyrocarbon. The polyvinylchloride layer provides the necessary strength, while the polyhalohydrocarbon resin layer provides superior resistance to moisture vapor transmission.

The polyhalohydrocarbon resin employed in the present invention is pharmacologically inert, that is it does not react with the parenteral solution in such a manner that pharmacologically unacceptable materials are dissolved in the solution. Furthermore, it is a material which is heatsealable by an external source of energy, such as radio frequency waves, which generates heat within the plastic material. Examples of suitable polyhalohydrocarbon resins are polychlorotrifluoroethylene resins such as those which are sold under the trademark Kel-F by the Minnesota Mining and Manufacturing Co., and related resins such as those which are sold under the trademark Aclar by the Allied Chemical Corp. The laminates of the polyvinylchloride resins and the polyhalohydrocarbon resin may be formed by a variety of conventional techniques, such as treating a film comprised of one of the resins with a suitable primer and compressing under heat through rollers thereon a layer of the other resin.

In addition to polyvinylchloride resin, other strength providing resins may be employed, so long as they are sealable by the method of the present invention, e.g. nylon, and the use of the word "polyvinylchloride" herein is intended to include such equivalents.

In order to form a parenteral solution bag which has its contents completely surrounded by the inner layer of a plastic laminate, with that inner layer being completely surrounded by the outermost layer; it is necessary to exclude all of the inner resin material from the seal area proper without interfering with or interrupting the completeness of the coverage of the inner layer about the solution. Coincidently, it must be sealed in such a manner that none of the outer most layer comes in contact with the solution. Unfortunately, the presently available polyhalohydrocarbon resins which are pharmacologically inert and highly resistant to moisture vapor transmission are not sufficiently strong in and of themselves and do not provide sufficiently strong seals or sufficiently strong laminates to qualify them for use as or in solution containers. As a result, when it is attempted by conventional methods to form a bag from a polyhalohydrocarbon film, it is found either that the bag material is not sufficiently strong to withstand normally encountered shock or the act of sealing renders the film readily rupturable along the seal area. If one attempts to prepare a bag from the laminate of this invention by conventional methods, with the polyholohydrocarbon layers in contact, it is found that the weakly bound laminate separates or delaminates outwardly from the seal area, resulting in a structurally weak container. On the other hand, if one attempts to prepare a bag from such a laminate by placing the vinyl layers in face to face relationship the resulting bag, although resistant to moisture vapor transmission and strong and impact resistant, unfortunately "leaches" vinyl plasticizers and the like into the parenteral solution contents.

It has now been discovered that the bag of the present invention may be readily prepared by a novel method which comprises placing two sheets of the vinyl-polyhalohydrocarbon resin laminate in face to face relation with the polyhalohydrocarbon layers in contact, (this may be done by employing two separate sheets of laminate or folding one larger sheet of laminate back upon itsself), placing the thus positioned sheets within a sealing die of the desired bag form, energizing said die with a source of energy that will generate sufficient heat within the plastic material itself to cause it to melt, and simultaneously exerting sufficient force upon said die to push the melted vinyl through the melted polyhalohydrocarbon resin so that the seal area proper contains only vinyl. A second internal seal containing only polyhalohydrocarbon is formed immediately adjacent this seal area proper. The resulting bag has a complete inner layer of polyhalohydrocarbon resin and a complete outer layer of vinyl. If desired, the bags may be formed and filled simultaneously with the parenteral solution in a continuous operation.

The discovery of a method by which a strong impact resistant bag can be formed is truly surprising because, as previously stated, the polyvinylchloride resin—polyhalohydrocarbon resin laminate is a weak one, i.e. it requires only about 1 pound of pull to strip the polyhalohydrocarbon layer from the laminate in a one inch wide section. However, when sealed by the novel technique of the present invention even this weakly bound laminate is adequate. In other words, the novel method of the present invention eleminates the need to have strongly bound laminates to form strong, impact-resistant containers.

In the preferred practice of the method of the present invention, a laminate having an outer layer of .015 inch polyvinylchloride resin and an inner layer of .001 inch polyhalohydrocarbon resin (e.g. Kel-F or Aclar) is employed. Two sheets of the laminate are placed in a face to face relationship with the polyhalohydrocarbon faces in contact and positioned within a bag forming die. The die is connected to a radio frequency source such as a Callanan Model No. 20 generator—35 megacycle, manufactured by J. A. Callanan Co., Chicago, Illinois. The die is then energized sufficiently to melt and soften both the vinyl and polyhalohydrocarbon and a force of 15 p.s.i. to 130 p.s.i. exerted in the direction of the laminate. The energy and force is maintained sufficiently long to force the melted vinyl through the melted polyhalohydrocarbon which in turn is forced out of the seal area proper (usually within about 5 seconds).

To further illustrate the character of the present invention a brief description follows in which reference is made to the accompanying drawing in which FIGURE 1 represents an elevational view of a parenteral solution container embodying the present invention; FIGURE 2 is a cross-sectional view taken along lines 2—2 of FIGURE 1; FIGURE 3 shows an apparatus for the sealing of the laminate sheets; and FIGURE 4 shows the apparatus of FIGURE 3 and seal formed by the practice of the method of the present invention.

In the drawing is seen the parenteral solution container 10 provided with hanger means 11 and an outlet port 12. The container comprises 2 sheets of laminate which have been sealed about their periphery. The bag 10 comprises an inner layer 14 which is completely surrounded by an outer layer 15 as seen in FIGURE 2. The seal proper 13 is comprised entirely of the material of the outer layer, whereas the seal 16 is comprised entirely of the material of the inner layer. In the preferred practice the bag is formed of the previously described laminate by the method which has also been described. FIGURE 3 shows two sheets of laminate with their respective layers of the polyhalohydrocarbon resin 14 and polyvinylchloride resin 15. It is seen that the polyhalohydrocarbon layers are in face to face contact. The dies 17 and 17a are connected by suitable means to a source of radio frequency energy, which is not shown. By energizing the two sheets of laminate via radio frequency energy and at the same time pushing upon the die in the direction of the sheets a seal proper 13 is obtained which as shown in FIGURE 4 is entirely composed of the polyvinylchloride. The polyhalohydrocarbon film which originally was within the area between the dies has by virtue of the radio frequency energization been melted, and, by virtue of the force exerted, pushed out of the area directly beneath the die to form the seal 16. As seen in FIGURE 2, it forms a complete enveloping layer about the contents of the bag which layer is in turn completely within the vinyl outer layer.

It appears that in order to obtain this complete inner enveloping layer which completely surrounds the solution and in turn is completely surrounded by the outer layer of the laminate it is necessary that the polyhalohydrocarbon layer be heatable by an external source of energy which generates heat within the plastic material rather than by conduction from an external source. For this reason the present invention is restricted to those polyhalohydrocarbons which are so energized or preferably those which are ultrasonic or radio frequency sealable. It will be recognized that with the various different resins some variance in the degree of force required and the adjustment of the radio frequency of the generator will be necessary. Such modifications and variations are believed to be within the scope of the person skilled in the art, and therefore may be made without departing from the spirit and scope of the present invention.

What I claim is:

1. A plastic container for therapeutic substances comprising a bag-like member provided with a pharmaceutically acceptable, moisture vapor transmission resistant, pharmacologically inert layer composed of a polyhalohydrocarbon resin, and an outer thermoplastic strength providing layer laminated to said inner layer, said inner layer completely enclosing the contents of said container, and said outer layer completely enclosing said inner layer.

2. The container of claim 1 in which the outer strength providing layer is composed of polyvinylchloride resin.

3. The container of claim 1 in which the inner layer is comprised of polychlorotrifluoroethylene.

References Cited by the Examiner
UNITED STATES PATENTS

| | | | |
|---|---|---|---|
| 2,554,157 | 5/1951 | Snyder | 229—55 |
| 2,772,444 | 12/1956 | Burrows et al. | |
| 2,786,622 | 3/1957 | Ross et al. | 229—55 |
| 2,811,471 | 10/1957 | Homeyer. | |
| 2,898,027 | 8/1959 | Scholle | 229—55 |
| 3,058,313 | 10/1962 | Robbins | 229—48 |
| 3,078,201 | 2/1963 | Christie. | |
| 3,112,057 | 11/1963 | Lipschutz et al. | 229—55 X |
| 3,113,899 | 12/1963 | Hoag et al. | 156—273 |
| 3,122,297 | 2/1964 | Sachs. | |
| 3,188,257 | 6/1965 | Hecht | 156—273 |

GEORGE O. RALSTON, *Primary Examiner.*

DOUGLAS J. DRUMMOND, JOSEPH R. LECLAIR, DAVIS T. MOORHEAD, *Examiners.*